United States Patent
Hanson et al.

(10) Patent No.: US 12,436,931 B2
(45) Date of Patent: *Oct. 7, 2025

(54) METHOD OF PERFORMING TRANSACTIONAL AND ANALYTICAL DATA PROCESSING USING A DATA STRUCTURE

(71) Applicant: SingleStore, Inc., San Francisco, CA (US)

(72) Inventors: Eric Hanson, Bellevue, WA (US); Szu-Po Wang, San Francisco, CA (US); Zhou Sun, San Francisco, CA (US); Connor Gregory Watts, Seattle, WA (US); Nikita Shamgunov, San Francisco, CA (US); Yevgeniy Kogan, Kirkland, WA (US)

(73) Assignee: SingleStore, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/540,374

(22) Filed: Dec. 14, 2023

(65) Prior Publication Data

US 2024/0111744 A1 Apr. 4, 2024

Related U.S. Application Data

(63) Continuation of application No. 17/368,677, filed on Jul. 6, 2021, now Pat. No. 11,886,407, which is a (Continued)

(51) Int. Cl.
*G06F 16/22* (2019.01)
*G06F 16/2453* (2019.01)

(52) U.S. Cl.
CPC ........ *G06F 16/221* (2019.01); *G06F 16/2282* (2019.01); *G06F 16/24549* (2019.01)

(58) Field of Classification Search
CPC .............. G06F 16/221; G06F 16/2282; G06F 16/24549
See application file for complete search history.

(56) References Cited

U.S. PATENT DOCUMENTS 10,311,154 B2 6/2019 Lahiri et al.
10,474,652 B2 11/2019 Baskett et al.
(Continued)

OTHER PUBLICATIONS

Per-äee et al., "Real-time analytical processing with SQL server", Proceedings of The VLDB Endowment, Assoc. of Computing Machinery, New York, NY, vol. 8, No. 12, Aug. 1, 2015, pp. 1740-1751, XP058072841.
(Continued)

*Primary Examiner* — Tony Wu
(74) *Attorney, Agent, or Firm* — EIP US LLP

(57) ABSTRACT

Disclosed herein is a computer-implemented method of processing a query using a columnstore comprising a plurality of segments, the method comprising: receiving a query comprising a parameter; determining a key corresponding to the parameter; identifying a mapping structure, from a plurality of mapping structures, relating to said key, wherein each mapping structure corresponds to a respective segment of the columnstore; interrogating the identified mapping structure to determine a value corresponding to the key, wherein the value identifies an entry of an index table of a plurality of index tables that corresponds to the respective segment, wherein the entry of the index table identifies a row of the respective segment of the columnstore relating to the parameter; and retrieving data relating to the parameter from a data source based on data stored in the entry of the index table.

17 Claims, 11 Drawing Sheets

Related U.S. Application Data continuation of application No. 16/579,393, filed on Sep. 23, 2019, now Pat. No. 11,068,454.

(56) References Cited

U.S. PATENT DOCUMENTS

| | | |
|---|---|---|
| 10,671,641 B1 | 6/2020 | Holenstein et al. |
| 2011/0029569 A1 | 2/2011 | Ganesh et al. |
| 2011/0219020 A1 | 9/2011 | Oks et al. |
| 2011/0264667 A1 | 10/2011 | Harizopoulos et al. |
| 2014/0122439 A1 | 5/2014 | Faerber et al. |
| 2014/0279961 A1 | 9/2014 | Schreter et al. |
| 2014/0304275 A1 | 10/2014 | Baskett et al. |
| 2015/0278268 A1 | 10/2015 | El-Ali |
| 2016/0078089 A1 | 3/2016 | Hu et al. |
| 2016/0125021 A1 | 5/2016 | Birka et al. |
| 2017/0097977 A1 | 4/2017 | Yoon et al. |
| 2017/0270150 A1 | 9/2017 | Wright et al. |
| 2018/0075116 A1 | 3/2018 | Nakamura |
| 2019/0294615 A1 | 9/2019 | Plattner et al. |
| 2020/0073863 A1 | 3/2020 | Jiang |

OTHER PUBLICATIONS

Bisig, Christian, "Introduction to Column Stores with MemSQL", Dec. 31, 2015, pp. 1-63, XP055750273, URL:https://wiki.hsr.ch/Datenbanken/files/SEM_DBS_HS1516_Column_Stores_with_MemSQL_Bisig_Paper.pdf.

International Search report and Written Opinion report dated Nov. 24, 2020 for PCT Application No. PCT/US2020/051472.

United States Non-Final Office Action dated Jun. 2, 2020 for U.S. Appl. No. 16/579,393.

United States Final Office Action dated Dec. 21, 2020 for U.S. Appl. No. 16/579,393.

United States Non-Final Office Action dated Sep. 29, 2022 for U.S. Appl. No. 17/368,677.

Schaffner et al., "A hybrid row-column OLTP database architecture for operational reporting", International Workshop on Business Intelligence for the Real-Time Enterprise. Springer, Berlin, Heidelberg, 2009.

United States Final Office Action dated Apr. 28, 2023 for U.S. Appl. No. 17/368,677.

European 94(3) Examination Report dated Jan. 30, 2024 for European Application No. 20789305.8.

Unknown, "Inside the SQL Server 2012 Columnstore Indexes", May 29, 2012, (May 29, 2012), pp. 1-9, XP093123670.

Peer-Ake Larson et al., "Enhancements to SQL server column stores", Proceedings of the 2013 international conference on Management of data, SIGMOD '13, Jun. 22, 2013 (Jun. 22, 2013), pp. 1159-1168, XP055161943, New York, New York, USA, DOI: 10.1145/2463676.2463708, ISBN: 978-1-45-032037-5.

Unknown, "MemSQL Documentation: Release 4.1", Oct. 14, 2015, (Oct. 14, 2015), pp. 1-469, XP093123656.

131

| Key | Local index id | Position in local index |
|---|---|---|
| 15678 | 151 | 1 |

151

| Position | Key | Value |
|---|---|---|
| 1 | 15678 | 3 |

133

| Key | Local index id | Position in local index |
|---|---|---|
| 15678 | 153 | 1, 2 |

153

| Position | Key | Value |
|---|---|---|
| 1 | 15678 | 2 |
| 2 | 15678 | 4 |

Figure 4

METHOD OF PERFORMING TRANSACTIONAL AND ANALYTICAL DATA PROCESSING USING A DATA STRUCTURE

CROSS-REFERENCE TO RELATED APPLICATIONS

This application is a continuation of U.S. application Ser. No. 17/368,677, filed Jul. 6, 2021, which is a continuation of U.S. application Ser. No. 16/579,393, filed Sep. 23, 2019, now U.S. Pat. No. 11,068,454. Each of the above-referenced patent applications are incorporated by reference in its entirety.

BACKGROUND

Technical Field

The present application relates to transaction and analytical processing in databases and, more specifically, methods and systems for facilitating and increasing the efficiency of search queries and functions called on database systems.

Description of the Related Technology

As technologies advance, the amount of information stored in electronic form and the desire for real-time or pseudo real-time ability to search, organize and/or manipulate such information is ever increasing. Database management systems, sometimes also referred to as databases and data warehouses, are designed to organize data in a form that facilitates efficient search, retrieval or manipulation of select information. Typical database management systems allow a user to carry out transactional or analytical processing by submitting a "query" or calling one or more functions in a query language for searching, organizing, retrieving and/or manipulating information stored within a respective database.

Certain database table or record set structures, also known as access methods, are designed to store data in accordance with how the data is going to be used. Two examples of different database access method designs are rowstore tables and columnstore tables. Typically, rowstore tables are used for online transaction processing (OLTP) workloads and columnstore tables are used for online analytical processing (OLAP) workloads. However, sometimes both transactional processing and analytical processing are required.

It would be advantageous to be able to serve a workload containing both transactional and analytical queries. In addition, it would be advantageous to reduce the resources incurred in processing queries and updates on a rowstore table and a columnstore table.

SUMMARY

According to a first aspect of the present disclosure there is provided a computer-implemented method of processing a query using a columnstore comprising a plurality of segments, the method comprising: receiving a query comprising a parameter; determining a key corresponding to the parameter; identifying a mapping structure, from a plurality of mapping structures, relating to said key, wherein each mapping structure corresponds to a respective segment of the columnstore; interrogating the identified mapping structure to determine a value corresponding to the key, wherein the value identifies an entry of an index table of a plurality of index tables that corresponds to the respective segment, wherein the entry of the index table identifies a row of the respective segment of the columnstore relating to the parameter; and retrieving data relating to the parameter from a data source based on data stored in the entry of the index table.

Using per-segment mapping structures provides fast seeking via a corresponding index table to one or more rows of the columnstore because scanning of entire segments and the entire columnstore is not required. As a result, the columnstore is more useable for OLTP-like workloads, which often require one or more rows to be located extremely efficiently. In addition, results relevant to a received query are identified more quickly, enabling a quicker query response time.

According to a second aspect of the present disclosure there is provided a computer-implemented method of generating a data structure relating to a columnstore, the method comprising: obtaining a columnstore comprising a plurality of segments, each segment comprising a plurality of columns and having at least one row; generating a mapping structure and an index table for each of the plurality of segments, wherein each mapping structure and each index table comprise at least one entry, each entry of the respective mapping structure comprising a mapping between a key and a value identifying at least one entry of the corresponding index table comprising a mapping between the key and a row in a respective segment of the plurality of segments.

The use of mapping structures and corresponding index tables for identifying rows of a columnstore table relevant to a parameter of a query speeds up query processing thereby reducing waiting time for obtaining results for the query.

According to a third aspect of the present disclosure there is provided a computer-implemented method of using a mapping structure, the method comprising: identifying the mapping structure from a plurality of mapping structures, wherein the mapping structure relates to a key corresponding to a parameter of a query and wherein each mapping structure corresponds to one or more segments of the columnstore table; interrogating the mapping structure to determine a value corresponding to the key, wherein the value identifies an entry of a corresponding index table that corresponds to the respective segment, wherein the entry of the index table identifies a row of the respective segment of the columnstore table relating to the parameter; and retrieving data relating to the parameter from a data source based on data stored in the entry of the index table.

The mapping structure and index table pairings provide fast seeking, which means the columnstore able to serve a workload containing both transactional and analytical queries.

BRIEF DESCRIPTION OF THE DRAWINGS

Various features of the present disclosure will be apparent from the detailed description which follows, taken in conjunction with the accompanying drawings, which together illustrate, features of the present disclosure, and wherein:

FIG. 4 is a schematic diagram of a plurality of mapping structures and a plurality of index tables, according to an example.

DETAILED DESCRIPTION

A columnstore access method stores data using a column-wise format so that entries of a particular column of a table are grouped together, followed by entries of another column and so on.

Figure 1:
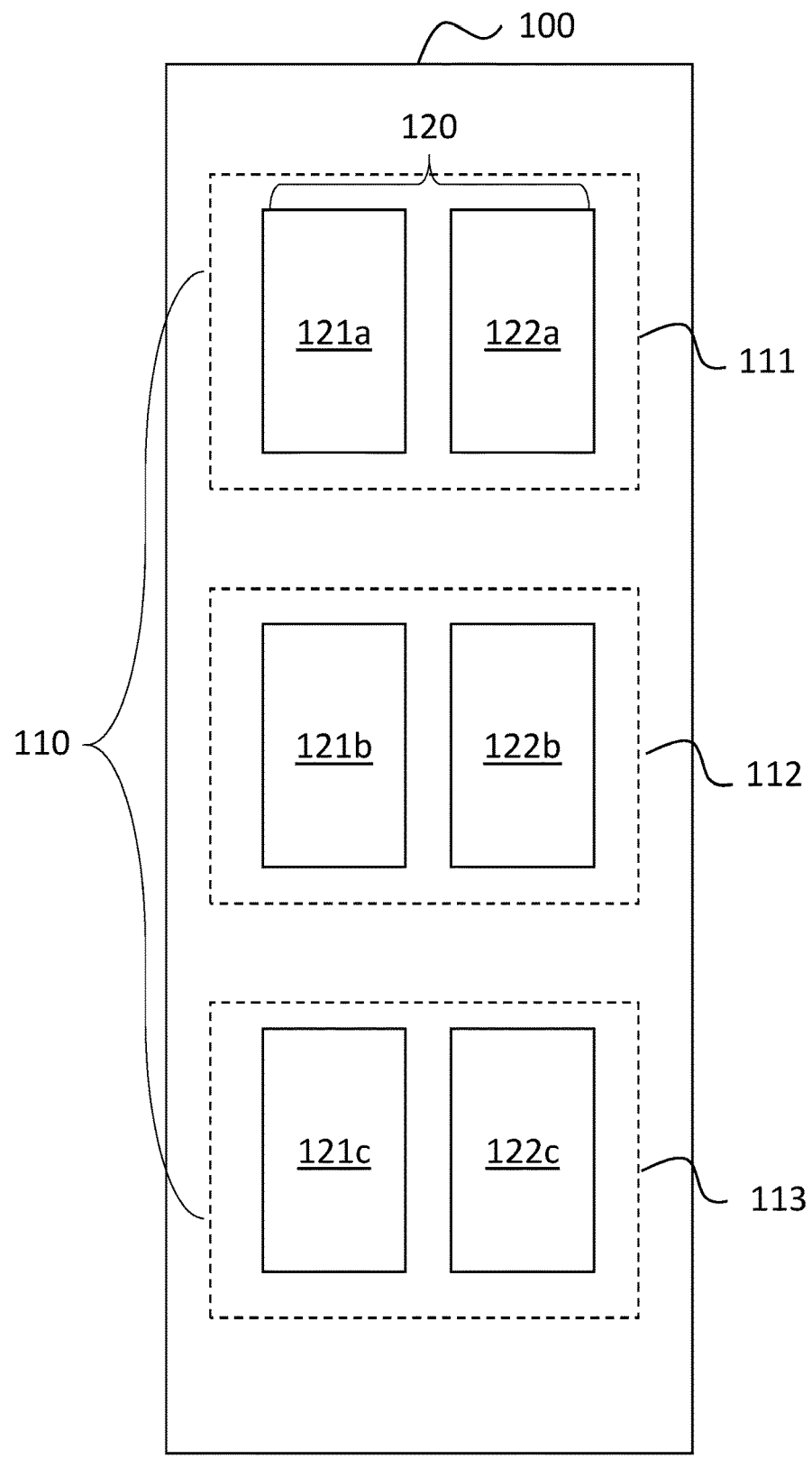
FIG. 1 is a schematic diagram of a columnstore table, according to an example.

FIG. 1 shows a columnstore table 100 (sometimes referred to as a "columnstore" or a "column-oriented table") to which embodiments described herein have particular application. The columnstore 100 comprises a plurality of segments 110 containing a first segment 111, a second segment 112 and a third segment 113. Each segment 111-113 contains segments of data for each column of a plurality of columns 120, referred to as column segments. In the example of FIG. 1, the plurality of columns 120 comprises a first column 121 and a second column 122. The first column 121 is divided into column segments 121*a-c* stored in each of the segments 111-113, respectively. As for the first column, the second column 122 is split into column segments 122*a-c* that are stored in the segments 111-113, respectively. Each of the column segments 121*a-c* and 122*a-c* comprise a plurality of rows that have entries in each of the plurality of columns 120. In one example, each column segment may contain in the order of hundreds of a million rows.

A query defines one or more parameters that are used as the basis for filtering data. In some examples, a value of a parameter may define a key that can be used to identify rows of a data structure, for example, a columnstore, deemed to be relevant to the parameter. Data within the relevant rows is then retrieved and may be used to form a query response.

Seek Using Mapping Structures

Figure 2:
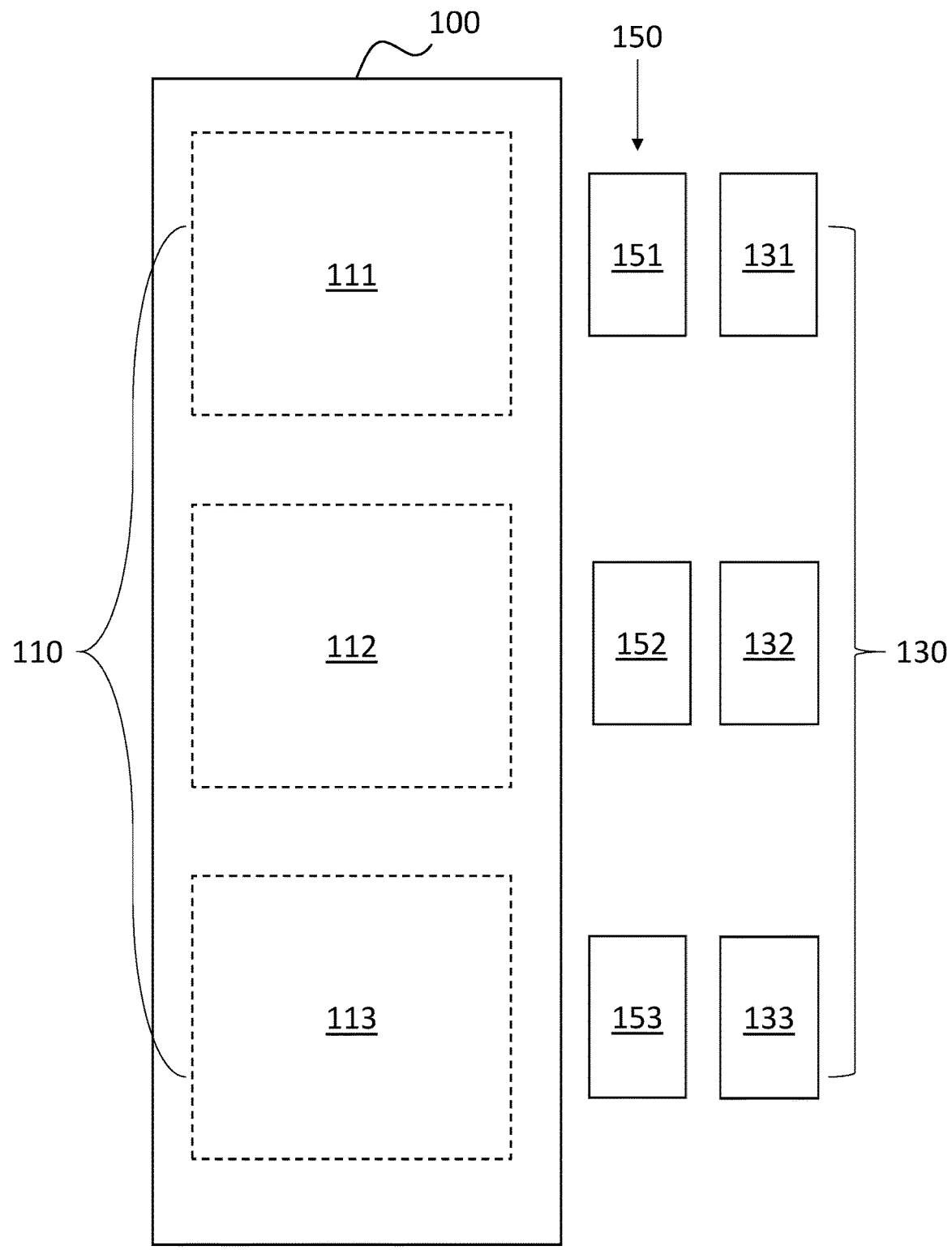
FIG. 2 is a schematic diagram of the columnstore of FIG. 1, according to an example.

FIG. 2 shows the columnstore 100, a plurality of mapping structures 130, and a plurality of index tables 150. The plurality of mapping structures 130 comprises a first mapping structure 131, a second mapping structure 132 and a third mapping structure 133. The first mapping structure 131 corresponds to the first segment 111, the second mapping structure 132 corresponds to the second segment 112 and the third mapping structure 133 corresponds to the third segment 113. In this respect, it is understood that each of the mapping structures 131-133 corresponds to a subsection of the overall columnstore 100 and is therefore local to its respective segment and may be referred to as a "local mapping structure".

The plurality of mapping structures may be exemplified by hash tables; dictionaries; B-trees; radix trees; and interval buckets.

The plurality of index tables 150 comprises a first index table 151, a second index table 152 and a third index table 153. The plurality of index tables 150 each comprise at least one row. The first index table 151 corresponds to the first segment 111, the second index table 152 corresponds to the second segment 112 and the third index table 153 corresponds to the third segment 113. In this respect, it is understood that each of the index tables 151-153 is local to its respective segment and thus may be referred to as a "local index table".

Accordingly, each of the plurality of mapping structures 130 is paired with a respective index table of the plurality of index tables 150. In one example, a pairing of a mapping structure and an index table is created when the respective segment of the columnstore is created.

Each mapping structure 131-133 maps a plurality of keys to respective values that identify rows of the corresponding index table 151-153. Each index table 151-153 maps the same plurality of keys, as mapped by its corresponding mapping structure 131-133, to a row of the corresponding segment 111-113.

Using per-segment mapping structures provides fast seeking to one or more rows of the columnstore 100 because scanning of entire segments is not required. In another example, each mapping structure may correspond to a plurality of segments of the columnstore, where the number of segments to which a mapping structure corresponds depends on a target or predetermined speed for seeking rows or providing a response to a query.

The plurality of keys that is mapped by the mapping structures 131-133 and the index tables 151-153 relates to one or more conditions of a query, where such conditions are defined by a parameter within the query. The values within the index tables to which the keys are mapped through use of the mapping structures identify one or more rows of a segment of the columnstore 100 that relate to a parameter of a query. The entries of the identified rows contain data related to the key and thus the parameter of the query.

Figure 3:
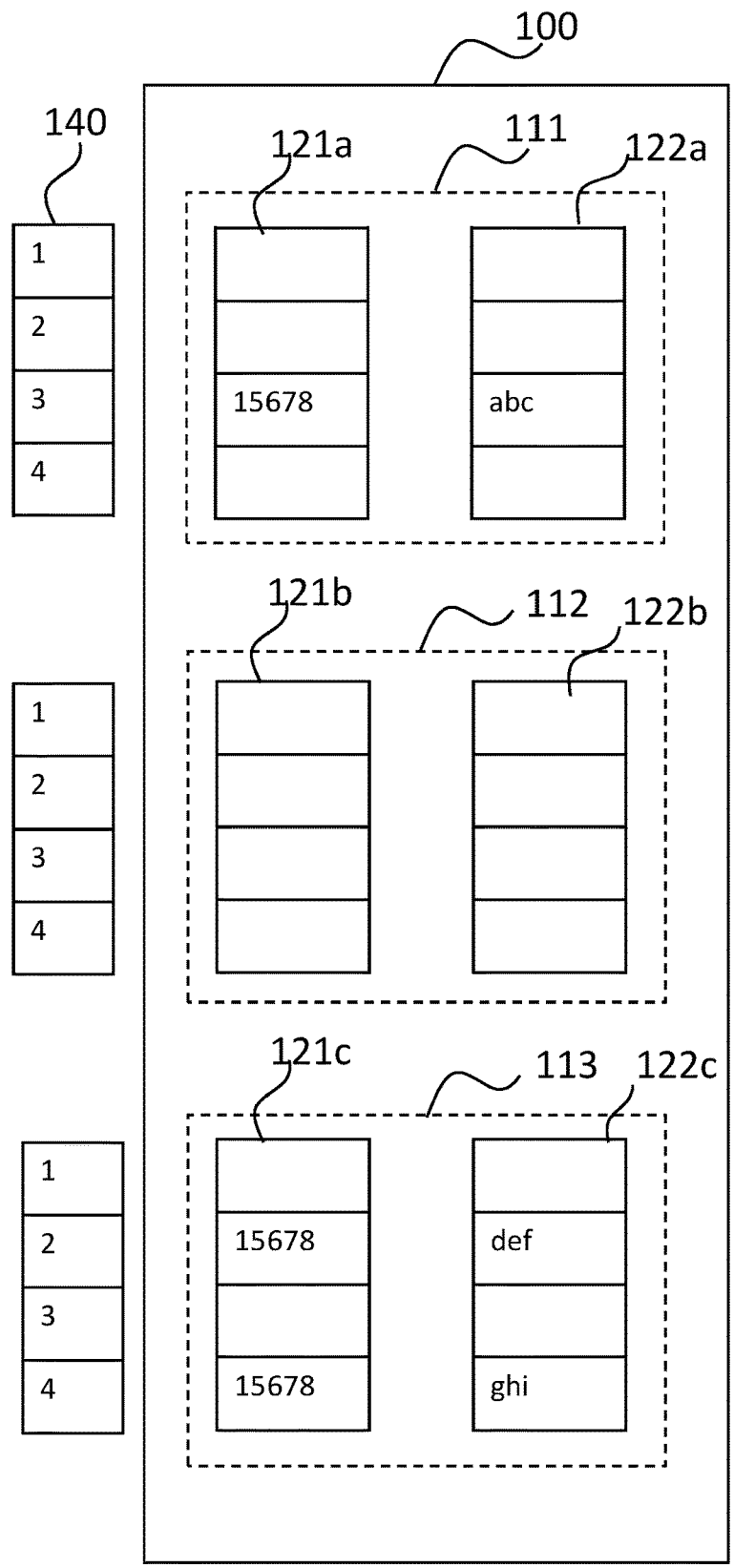
FIG. 3 is a schematic diagram of the columnstore of FIG. 1 and a corresponding array, according to an example.

FIG. 3 shows the columnstore 100 and a row number array 140 that contains numbers for each row within each segment of the columnstore 100. In the example of FIG. 3 the column segments 121*a-c* of the first column 121 contain numerical identifiers, id numbers, and the column segments 122*a-c* of the second column 122 contain text, which in some examples, may be represented by a string. Blank entries in each column within FIG. 3 are simply used to represent entries that are not referred to in the example of FIG. 3, rather than empty or null values. In one example, the columnstore 100 could be considered as a fact table within a star schema, where the schema would also contain respective dimension tables for the numerical identifiers of the column 121*a* and the text of column 122*a*.

A query, Q, is received that states: find text where id=15678. The query contains a parameter "id=15678". The value of the parameter is the number "15678". In this example, the value "15678" can be considered to be a key because it can be used to identify and access rows within the columnstore 100 because "15678" is an id number and the first column 121 of the columnstore contains id numbers. In the example of FIG. 3, the key "15678" is a non-unique key of the column 121 because there a three rows containing "15678", that is rows 3 of segment 111, and rows 2 and 4 of segment 113, so "15678" is not unique within the column. In addition, the key "15678" may be a primary key in another table (not shown), for example a dimension table that contains the description information associated with the numerical identifiers, in which case it would be a foreign key.

In this example, the first segment 111 contains the value "15678" in the row identified as "3" within the row number array 140 and the third segment 113 contains the value "15678" in the rows identified as "2" and "4" within the row number array 140.

FIG. 4 shows the first mapping structure 131 and the first index table 151, and the third mapping structure 133 and the third index table 153 for the example of FIG. 3. As such, the second mapping structure 132, which does not contain the value "15678" in any rows, is not relevant so is not shown in FIG. 4.

The first mapping structure 131 maps the key 15678 to a value that identifies the index table 151 at position 1 as containing location data relating to the key 15678. The first index table 151 contains, at position 1, a value "3" that identifies the location of row 3 within the first segment 111 of the columnstore 100 as containing data related to the key 15678, in accordance with the example of FIG. 3.

Figure 5:
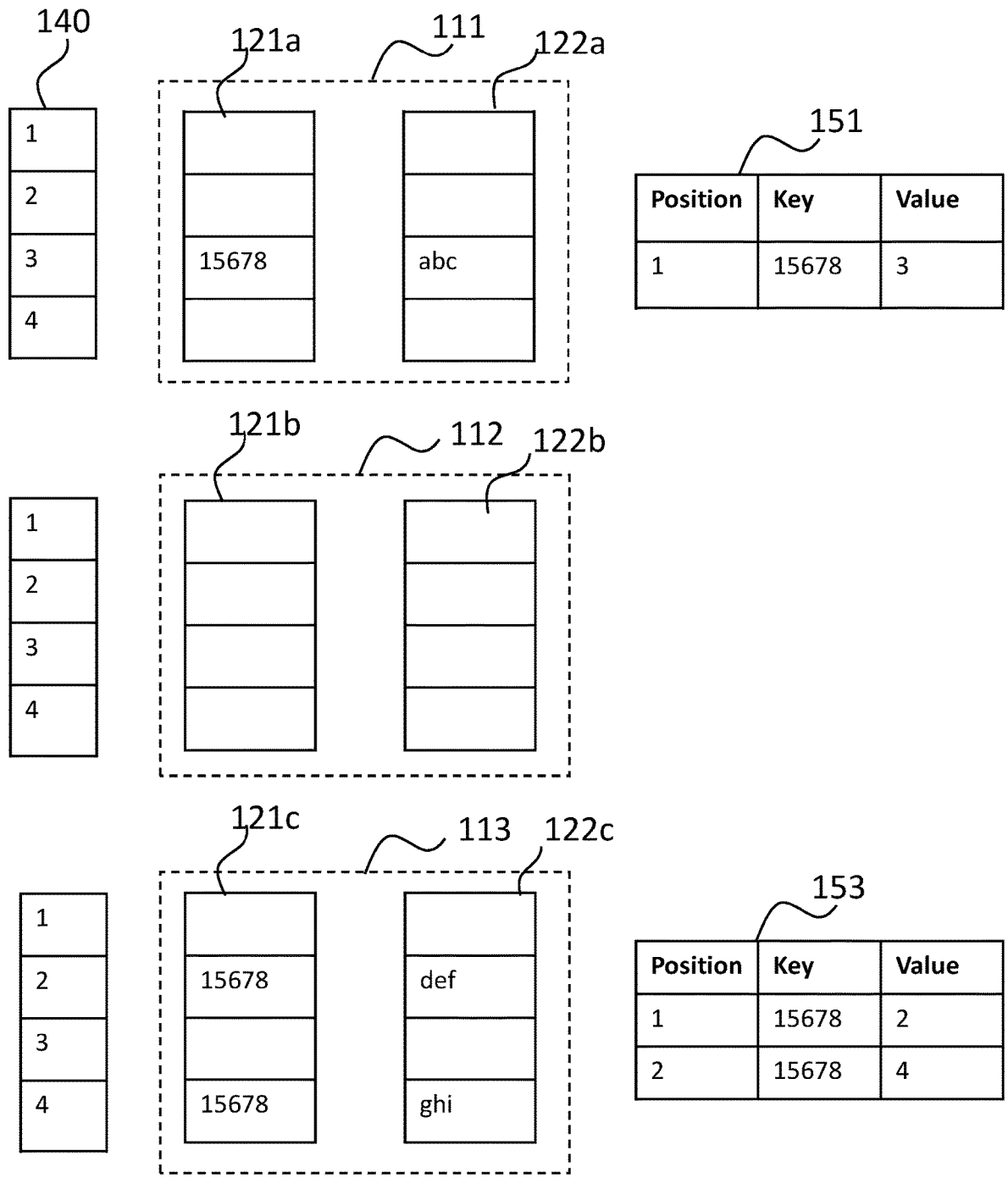
FIG. 5 is a schematic diagram of the columnstore of FIG. 1 and the mapping structures and index tables of FIG. 4, according to an example.

The third mapping structure 133 maps the key 15678 to a value that identifies the index table 153 at positions 1 and 2 as containing location data relating to the key 15678. The third index table 153 contains, at position 1 a value "2" and at position 2 a value "4" that respectively identify the locations of rows 2 and 4 within the third segment 113 of the columnstore 100 as containing data related to the key 15678, in accordance with the example of FIG. 3. The mapping provided by the index tables 151 and 153 is also shown in FIG. 5.

Accordingly, the mapping structures are lookup structures. The first and third mapping structures 131, 133 may be merged together to form a single mapping structure, in which case it is understood that respective sub-sections of the single mapping structure correspond to the index tables 151 and 153 and thus the column segments 111 and 113. In one example, the mapping structures may be stored on-disk.

After the query Q is received, the mapping structures 131 and 133 are interrogated using the key 15678 to identify the index tables 151 and 153 and positions therein. The index tables 151 and 153 are then interrogated directly at the identified positions to determine the values 3, 2 and 4, respectively. Data relating to the parameter is then retrieved based on the values stored at the identified positions of the index tables, that is the values 3, 2 and 4. For example, these rows can be identified as 111:3, 113:2, and 113:4, based on the pairing of segment identifier ("segmentID") and row number ("rowNumber"). Using the row identifiers (111:3; 113:2; 113:4) data within the entries of the rows 3, 2 and 4 in each of the column segments 122a (row 3) and 122c (rows 2 and 4) is then retrieved. In the example of FIGS. 3-5, the data to be retrieved is the text "abc" for row 3 of column segment 122a, "def" for row 2 of column segment 122c, and "ghi" for row 4 of column segment 122c.

Using mapping structures and index tables to identify rows of a columnstore that correspond to a parameter of a query enables fast seeks to the relevant rows, which makes the columnstore more useable for OLTP-like workloads, which often require one or more rows to be located extremely efficiently. In examples where the mapping structures are hash tables, it is understood that the uniqueness constraint required for primary indexes would not be not enforced because, as discussed in relation to FIG. 3, the key "15678" is a non-unique key, accordingly, in such a scenario the mapping structures are secondary indexes that do not physically cluster rows together based on key values (as in a primary index).

The mapping structures may be generated as the columnstore is created, whereby each new mapping structure is combined with other, older mapping structures as segments within the columnstore are created. Alternatively, the mapping structure may be combined with one or more others after all or a predetermined number of mapping structures have been created. The mapping structures and the corresponding index tables can be generated for particular columns of a columnstore that relate to a particular parameter within a query. In one example, the particular parameter may be client or user specific.

In relation to the processing of a particular query, there may be a determination or identification of the selectivity of each parameter of the query and, sometimes, a subsequent identification of the parameter that is most selective or the one or more parameters that satisfy a threshold relating to selectivity. In one example, a filter reordering algorithm may be executed to determine the order in which to apply the one or more parameters within the query, for example, whether to use a hash index to filter rows in a segment in cases where the query contains a mix of AND and OR conditions. Accordingly, the mapping structures and index tables may be interrogated based on the selectivity of parameters within a received query.

As an example, mapping structures and index tables may be generated in advance of receiving a query for a highly-selective, or most selective, filters so that further evaluation of rows is reduced. By tailoring the order of filtering based on selectivity, order-of magnitude speedups are provided for processing queries, reducing the required processing resources.

For example, a second parameter of a query may be determined to be less selective than a first parameter within the same query. In one scenario, a plurality of index tables may be generated for only the first parameter. Alternatively, a first plurality of index tables may be generated for the first parameter and a second plurality of index tables may be generated for the second parameter, whereby a respective key is determined for both parameters and used to identify a corresponding mapping structure from a first and second plurality of mapping structures. The identified mapping structures are interrogated to determine values corresponding to the respective keys, where the values identify respective entries of an index table of the first and second plurality of index tables and the respective entries identifies a row of the respective segment of the columnstore relating to the first parameter and a row of the respective segment of the columnstore relating to the second parameter. In this way, interrogation of the respective mapping structures for the first and second parameters may occur concurrently. The values relating to the first and second parameter are compared and one or more intersections between the parameters are identified based on the comparison. That is, it is determined whether any of the values relating to the first parameter are the same as those relating to the second parameter. Based on the intersections, data is retrieved from a data source that relates to both the first and second parameters. The index intersection may be used when an AND filter is used to define the relationship between the first and second parameters.

In a variation, where the first parameter is determined to be more selective than the second parameter, identification of values corresponding to the first parameter may occur before such identification for the second parameter, resulting in identification of values corresponding to the second parameter being based on the values identified for the first parameter. In this way, identification relating to the second parameter is carried out on a smaller pool of possible values (that is, only those deemed relevant to the first parameter) making the identification quicker because checks are not required on all the index tables of the second plurality of index tables.

In a further example, a mapping structure and corresponding index table may be generated, for example, by a database user (developer or administrator), for columns that are determined to have been referred to by a predetermined number of queries in order to speed-up seeks for those columns in response to future queries.

In the examples described, a mapping structure maps a plurality of keys to a plurality of positions within an index table in order to locate the keys within rows of a columnstore. The keys may be single or multi-column keys. For instance, in the previous example, the key "15678" is only for the identifier column so is a single column key. In addition, the corresponding mapping structures 131-133 are for the identifier column and not for both the identifier and text columns.

The use of the index tables with a mapping structure formed from merging of other mapping structures speeds up filtering of rows of the columnstore in response to a query because it is not necessary to scan each index table to identify a relevant row(s) of the columnstore. In addition, other processes that are concerned with the local index tables may be performed at the same time as the above-described seeking to relevant rows.

Figure 6:
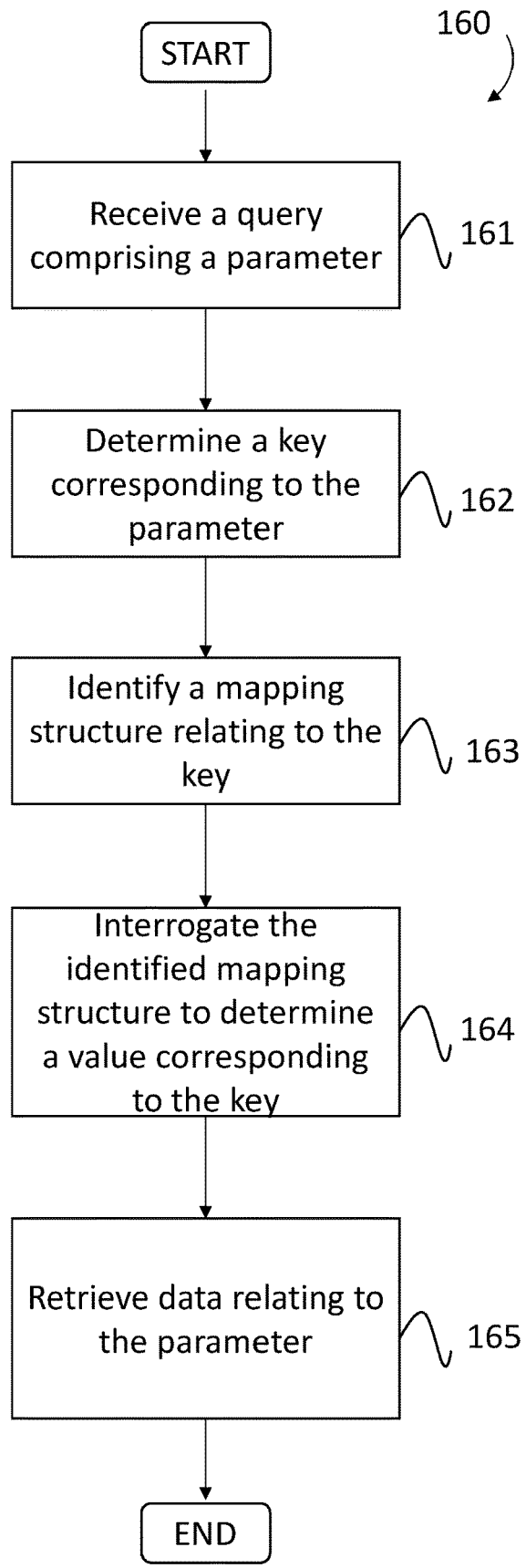
FIG. 6 is a flowchart of a method of processing a query, according to an example.

FIG. 6 is a flowchart of a method 160 of processing a query (for example, query Q described in relation to FIGS. 3-5) using a columnstore comprising a plurality of segments according to an embodiment. The method 160 is carried out by a computing device that may form part of a database management system or be a component that is logically and physically separate therefrom. The method 160 starts at block 161 where a query comprising a parameter is received (Q: find text where id=15678). The parameter (id=15678) specifies a condition on which the query Q is based and may be referred to as a query predicate. Next, the method 160 proceeds to block 162 where a key (15678) corresponding to the parameter (id=15678) is determined. Following this determination, at block 163, one or more mapping structures (mapping structures 131 and 133 in the example of FIGS. 3-5), or a subsection(s) of a mapping structure formed by merging a plurality of mapping structures, that relate to the key (15678), are identified from a plurality of mapping structures (130), each corresponding to one or more respective segments of the columnstore 100. Each of the plurality of mapping structures associated with the columnstore 100 may be checked to find the one or more mapping structures that contain matches for the key "15678".

The method 160 then proceeds to block 164 where the identified mapping structure (mapping structures 131 and 133), or a subsection thereof, is interrogated to determine one or more index tables ("Local index id"—FIG. 3) and a position(s) therein ("Position in local index"—FIG. 3) corresponding to the key (15678). The determined position identifies an entry of the related index table (in the example of FIGS. 3-5, the mapping structure 131 identifies entry 1 of index table 151 and the mapping structure 133 identifies entries 1 and 2 of index table 153). The entry of the index table identifies a row of the corresponding segment relating to the key (in the example of FIGS. 3-5 entry 1 of index table 151 identifies row 3 of the first segment of the columnstore and entries 1 and 2 of the index table 153 identified rows 2 and 4 of the third segment of the columnstore).

Next, the method 160 proceeds to block 165 where data relating to the parameter (id=15678) is retrieved from a data source based on the rows' positions stored in the identified entries of the index tables. In the example of FIGS. 3-5, data is retrieved from the columnstore 100, where the data contained by row 3 of the first segment includes the text "abc" and the data contained by rows 2 and 4 of the third segment includes text "def" and "ghi", respectively). In one example, the data relating to the parameter is contained within one or more fields in various columns of the identified row (in the example of FIGS. 3-5 the text data, which is the direct result of the query Q: find text where id=15678, is contained within the identified rows of the column 122*a*). Alternatively, the data relating to the parameter may be contained in a row of another data structure, where the data contained by the identified row identifies or points to the other data structure, for example a row store table or another columnstore table.

Subsegment Access

Once rows of a segment of the columnstore 100 have been identified as being relevant to a parameter of a received query, other data stored within the same row in different one or more columns of the columnstore is retrieved in order to generate a query response. The relevant rows may be identified using the seeking operation described in the section entitled "Seek using mapping structures", such as the seeking operation based on "id=15678" in the example presented with regard to FIGS. 3-5.

Figure 7:
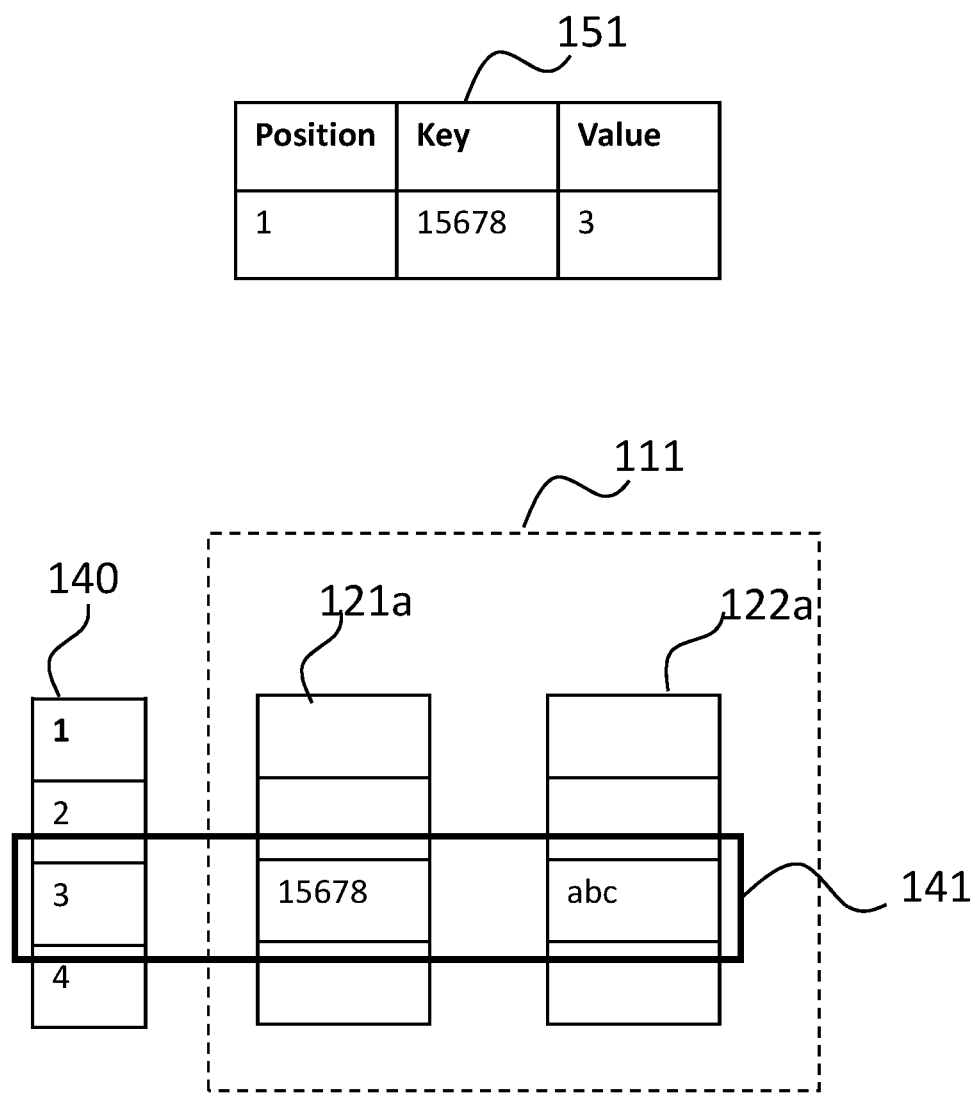
FIG. 7 is a schematic diagram of a segment of the columnstore of FIG. 1, according to an example.

FIG. 7 shows the first segment 111 of the columnstore 100 of FIGS. 1-5. As explained above, the first index table 151 maps the key 15678 to the value 3 in row number array 140, which identifies row 3 of the first segment 111, highlighted in bold and labelled 141. Accordingly, data within the other entries (sometimes referred to as "fields") of the identified row 141, such as data within the second column 122*a*, needs to be retrieved. In the example of FIG. 6, the entry "abc" within the text column 122*a* is located and retrieved in accordance with the query find text where id=15678. Accordingly, the data to be retrieved from fields of identified rows within one or more other columns depends on the content of a received query. As for query Q, other queries may specify the type of data of interest (and thus to be retrieved) and this could include data of any number of other columns of the columnstore. Otherwise, a received query may exclude data from certain columns from being retrieved or request for data to be retrieved from all the columns of a columnstore.

Although in FIG. 7 the "15678" entry of the column 121*a* and the "abc" entry of the second column 122*a* are depicted as being aligned and at the same position within the respective columns, this is a logical representation of the identified row 141 and the location of each of the entries will be dependent on how data in the respective columns have been stored. The data stored within the columnstore 100 is stored on disk and can be cached in memory. The storing of the data on disk may be implemented using a different storage scheme to that used to store the data in memory.

Figure 8:
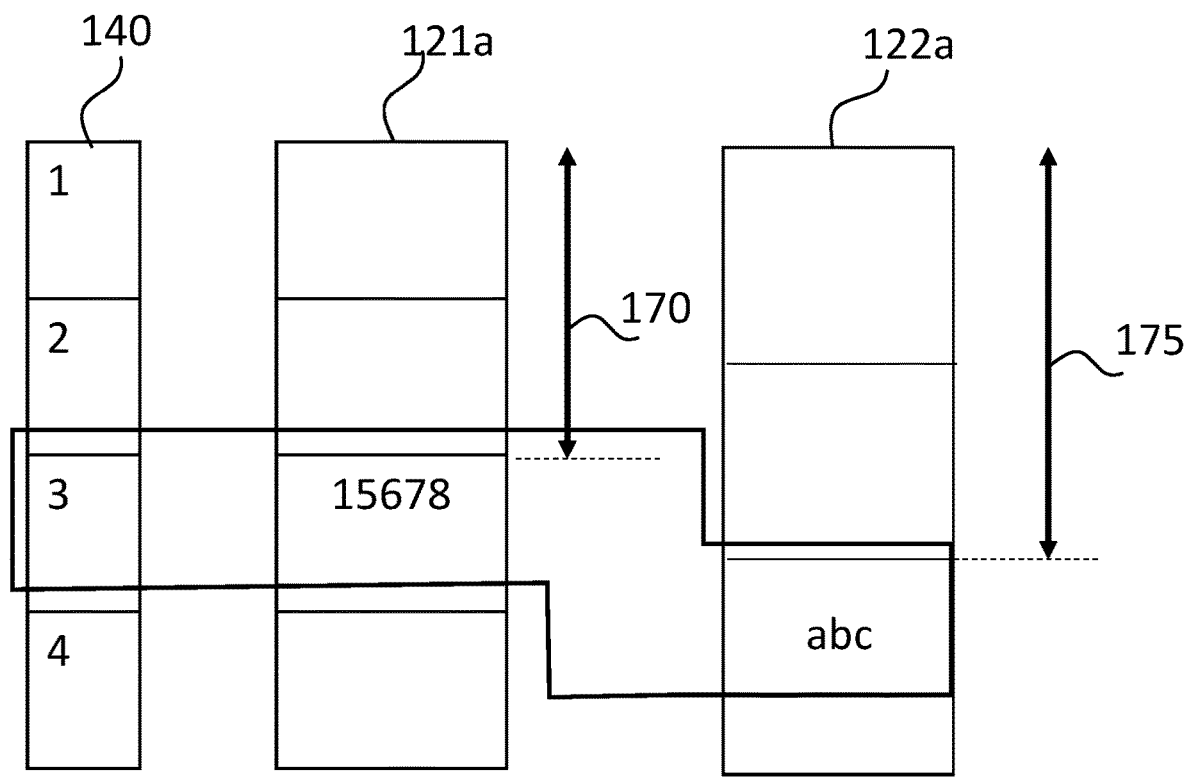
FIG. 8 is a schematic diagram of the segment of FIG. 7, according to an example.

FIG. 8 shows the first and second columns 121*a* and 122*a* of the first segment 111.

Data in columns 121*a* and 122*a* is stored according to a corresponding storage scheme, which, in some examples, may comprise a compression scheme and/or an encoding scheme such as integer encoding, run length encoding, integer run-length encoding, string run-length encoding, string encoding, integer value encoding, integer delta encoding, LZ4 encoding, and string dictionary encoding. The storage scheme of a column defines how many bits or bytes are assigned for storing data. Different columns may be associated with different storage schemes. This is visually represented within FIG. 8 by the entry "15678" of the column 121*a* being associated with a first offset 170 and entry "abc" of column 122*a* being associated with a second offset 175. In this example, the first offset 170 is smaller than the second offset 175, which may e.g. be a result of the fact that data of column 121*a* is stored with a higher compression ratio than that of the column 122*a*.

In order to retrieve the data abc from column 122*a* the offset 175 within the column 122*a* is determined based on the location of the identified row 141 of this column 122*a*, which in this example, is row 3 and the compression scheme for this column 122*a*, as will be explained below. After the offset 175 is determined, a location of the data abc is determined and the column 122*a* is accessed at that location in order to retrieve the data. This means that a seek operation can seek directly to a location in a column 122*a* that corresponds to the identified row, which makes the seek operation more efficient because the entire column segment does not require loading and then decompressing and/or decoding. This also results in a speed up in the time taken to access relevant data and, thus, quicker results.

As part of determining the offset 175, a number of rows preceding the identified row 141 within the first segment 111 is determined, for instance, for row 3 there are two preceding rows within the first segment 111. Looking to the third segment 113 in FIG. 3, row 2 has one preceding row within the segment 113 and row 4 has three preceding rows.

The determined number of preceding rows is used with the storage scheme of a particular column of the segment 111, in this case the storage scheme of column 122*a*, to determine the corresponding offset within the column segment.

The storage scheme of a column defines how many bits or bytes are assigned to storing each row of the segment 111. Accordingly, the offset 175 is determined by determining a fixed number of bits or bytes assigned to the rows preceding the identified row 141. For instance, in the example of FIG. 7, there are two rows preceding the identified row 141 and these two rows can be allocated a fixed number of bits or bytes per column segment 121*a*, 122*a* based on the storage scheme thereof.

As described in relation to FIGS. 7 and 8, for storage schemes with a fixed number of bytes or bits assigned per row or segment of a column (for example, dictionary encoding), the offset may be calculated during execution of each storage scheme by multiplying the fixed number of bytes or bits with the number of preceding rows. For storage schemes without a fixed, predetermined number of bytes per row, in other words a scheme that assigns a variable number of bytes per row (for example run-length encoding), an offset table may be built to contain information for such storage schemes, such as the offsets per-row or per-block. In cases where the offset table stores offsets per-block, the row offset within may be calculated during execution of the storage scheme by summing up the number of bytes per row for preceding rows within the block. For run-length encoding, values are stored in a column, such as: (value1, runLength1); (value2, runLength2); . . . (valueN, runLengthN), so to find the value at position k the (value, runLength) pairs are scanned and totaled until k is reached. This calculation may be determined during execution of a query, such as query, Q.

After the data "abc" of the column 122 has been located and retrieved a data processing operation may be performed. In an example where the data "abc" is encoded, one such data processing operation may be a decoding operation. In the example of FIGS. 1-7, a seek operation will directly seek to the relevant rows and so the subsequent decoding of those rows is the decoding of a subset of rows within a segment and may be referred to as segment-level selective decoding. In this way, the decoding is more efficient than decoding a whole segment because rows of a column segment that are not relevant to the query are not read or accessed and instead, are skipped. Other processes that are not related to the processing of the query Q, for example one or more unrelated transactional or analytical processes such as a "read query", may be carried out on the rows that are skipped at the same time as the identified rows are decoded because the rows skipped in relation to query Q may be relevant to the other, unrelated processes.

Although in the example of FIGS. 1-8 reference is made to an "identified row", in some scenarios, the identified row may comprise a plurality of rows, for example, if multiple of consecutive rows pass a filter (such as a filter corresponding to a parameter of a query) the rows may be identified as a run of X rows rather than X individual rows to improve efficiency by processing the run of X rows together. For run-length encoding, the identified row may be inside a multi-row run. In this case, the subsequent decoding of a block of X rows may be referred to as block-level selective decoding, so results in decoding of contiguous rows but advantageously avoids fully decoding an entire column. In some examples, namely where a row has already been decoded, the result may be stored in a cache and re-used so that the decoding process is not repeated for that row, saving processing resources and speeding up the response to a query.

Concurrent Updates

In some examples, multiple processes (transactional and/or analytical) may require access to the same segment of a columnstore at the same time, for example the first segment 111 of the columnstore 100. Using a segment-wide access lock can cause subsequent processes requiring access to that same segment to be blocked whilst a first process is being executed in relation to the segment. The blocking of processes can cause unnecessary waiting that slows down a computer or computer system that is relying upon the execution of one or more of the blocked processes.

A rowstore can be used in conjunction with the columnstore in order to improve concurrent access to a single segment of the columnstore 100. In some examples, access may be required to update data stored in a particular row or set of rows within the columnstore 100. A rowstore logically organizes data in a table with rows and columns yet physically stores data in a row-wise format so that fields of a particular row of a table are grouped together, followed by fields of another row and so on. Using a rowstore in combination with a columnstore provides a data store that allows easy update of the more recent data. In some examples, the rowstore is stored in Random Access Memory.

Figure 9:
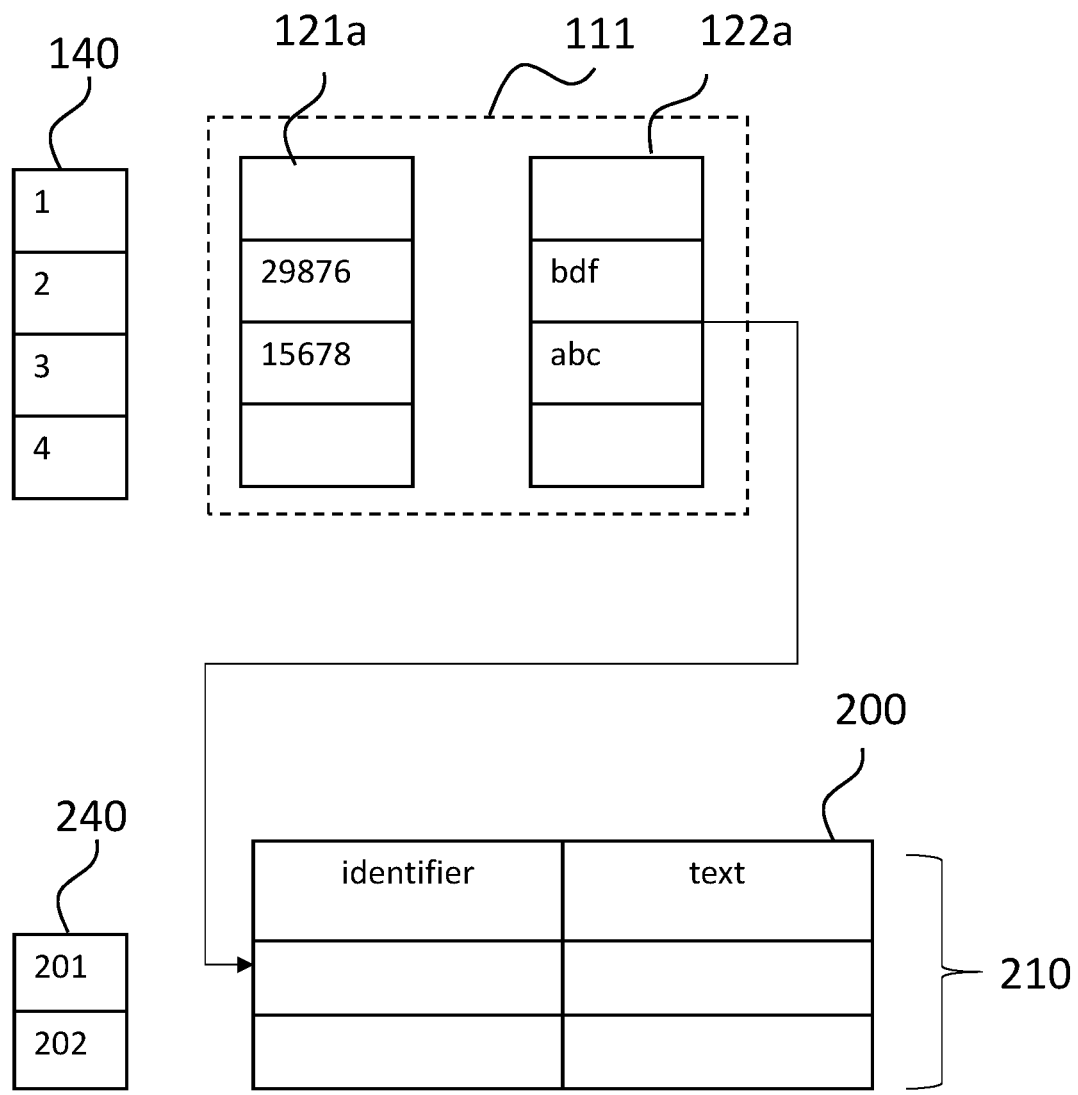
FIG. 9 is a schematic diagram of a columnstore and a rowstore data structure, according to an example.

FIG. 9 shows the columnstore 100 described in relation to FIGS. 1-8 and a logical representation of a rowstore 200, according to an example. The rowstore 200 comprises a plurality of rows 210 identified by a row number array 240, which is an optional feature shown in FIG. 9 for the purposes of explanation. A query, Q', is received that specifies: "update text to bgh for id=29876". Query Q' is understood to be a request to update a table comprising the columnstore 100 and the rowstore 200. Rows that are relevant to the query Q' are identified, in the example of FIG. 9 a relevant row is row "2" of segment 111 containing the identifier "29876" and the text "bdf". In some examples, row 2 may be identified using the seeking operation described in the section entitled "Seek using mapping structures". In addition, the location of data within row 2 of the second column 122*a* may be identified using the access operation described in the section entitled "Subsegment access".

After row 2 is identified, it is moved in its entirety to the rowstore 200. In the example of FIG. 9, row 2 is moved to the first row of the rowstore 200, row 201. Advantageously, the extraction of a particular row from the columnstore 100 to the rowstore 200 is not reliant on custom scripts written by a user of a computer system associated with the columnstore 100.

Figure 10:
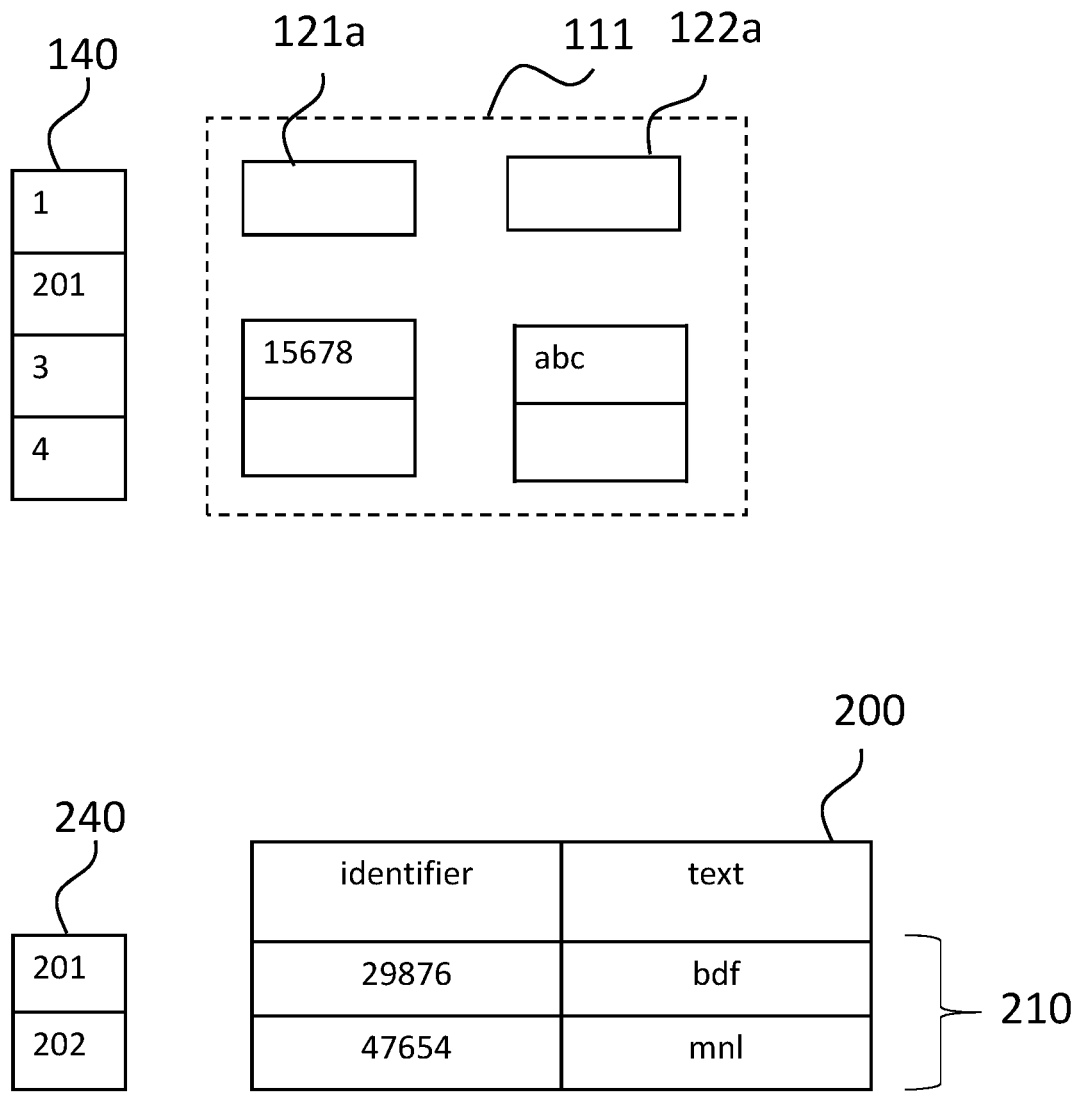
FIG. 10 is a schematic diagram of the columnstore and the row store of FIG. 9, according to another example.

FIG. 10 shows the columnstore 100 and the rowstore 200, according to an example. The rowstore 200 contains row 2 of the columnstore 100 in row 201. After row 2 is moved to row 201 of the rowstore, an access lock may be applied to the identifier ("rowID") of row 2, that is the segment identifier ("segment ID") and row number ("rowNumber") pair, which is (111, 2), within the rowstore 200 and the columnstore 100. Whilst the access lock is active the data within row 2 is manipulated in accordance with the query Q'. Accordingly, the text "bdf" is updated to "bdh". After the manipulation of row 2 is completed and row 2 contains updated data the access lock is released. The access lock is understood to be a temporary, row-level access lock that blocks access to the row in question but, due to its row-level granularity, allows other processes to access the first segment 11 of which row 2 is a part, which means concurrent processes can be carried out within the segment 111 without waiting, thus improving system throughput and response time. As a result of the moving and/or the updating of row 2, its status is updated to indicate that updated data of row 2 is located in the rowstore 200.

The row-level lock provides fine-grain concurrency control compared to segment-level lock, which means that conflicts between processes requiring access to the same segment, such as two write requests, is reduced because the likelihood of the two write requests requiring access to the same row is less than the probability of the two requests requiring access to the same segment.

In the example of FIG. 10, the row number array 140 of the columnstore 100 updates the status of row 2 by incorporating a pointer to row 201 in the rowstore 200 in place of row 2; this is depicted in FIG. 10 using "201" within the row number array 140. In some examples, a log data structure (not shown) comprises statuses of each of the rows in the columnstore 100 and thereby indicates whether a particular row in the columnstore 100 is active or has moved to the rowstore 200, in which case the row of the columnstore 100 is marked as inactive or retired. The log data structure may contain records of rows in the rowstore 200 that correspond to retired rows within the columnstore 100. For example, the log data structure may be a bit vector marking the inactive or retired rows.

The rowstore 200 may comprise multiple indexes, for example, more than one or each column of the rowstore 200 may correspond to at least one index table. Referring to FIG. 9, the "identifier" and "text" columns of the rowstore 200 could have corresponding index tables. Having multiple index tables associated with the rowstore 200 improves the performance of a lookup by enabling fast seeking to rows within the rowstore 200 rather than scanning the entire rowstore 200.

FIG. 10 shows the rowstore 200, according to an example. The plurality of rows 210 of the rowstore 200 contain data: the first row, row 201, contains row 2 of the columnstore 100 after it was promoted and updated as a result of the received query, Q'; and the second row, row 202, contains another row promoted from the columnstore 100 as a result of another, different query and contains the identifier 47654 and the text mnl. After a predetermined period of time, for example, when a predefined number of rows of the plurality of rows 210 are unchanged for a predetermined period of time, for example 2 minutes, a new segment of the columnstore 100 is created comprising the data of the rowstore 200. In another example, a new segment of the columnstore 100 may be created as a result of the size of the rowstore 200 satisfying (for example, exceeding) a predetermined size threshold for the rowstore 200. As an example, a predetermined size threshold for the rowstore 200 may be 32 MB.

Figure 11:
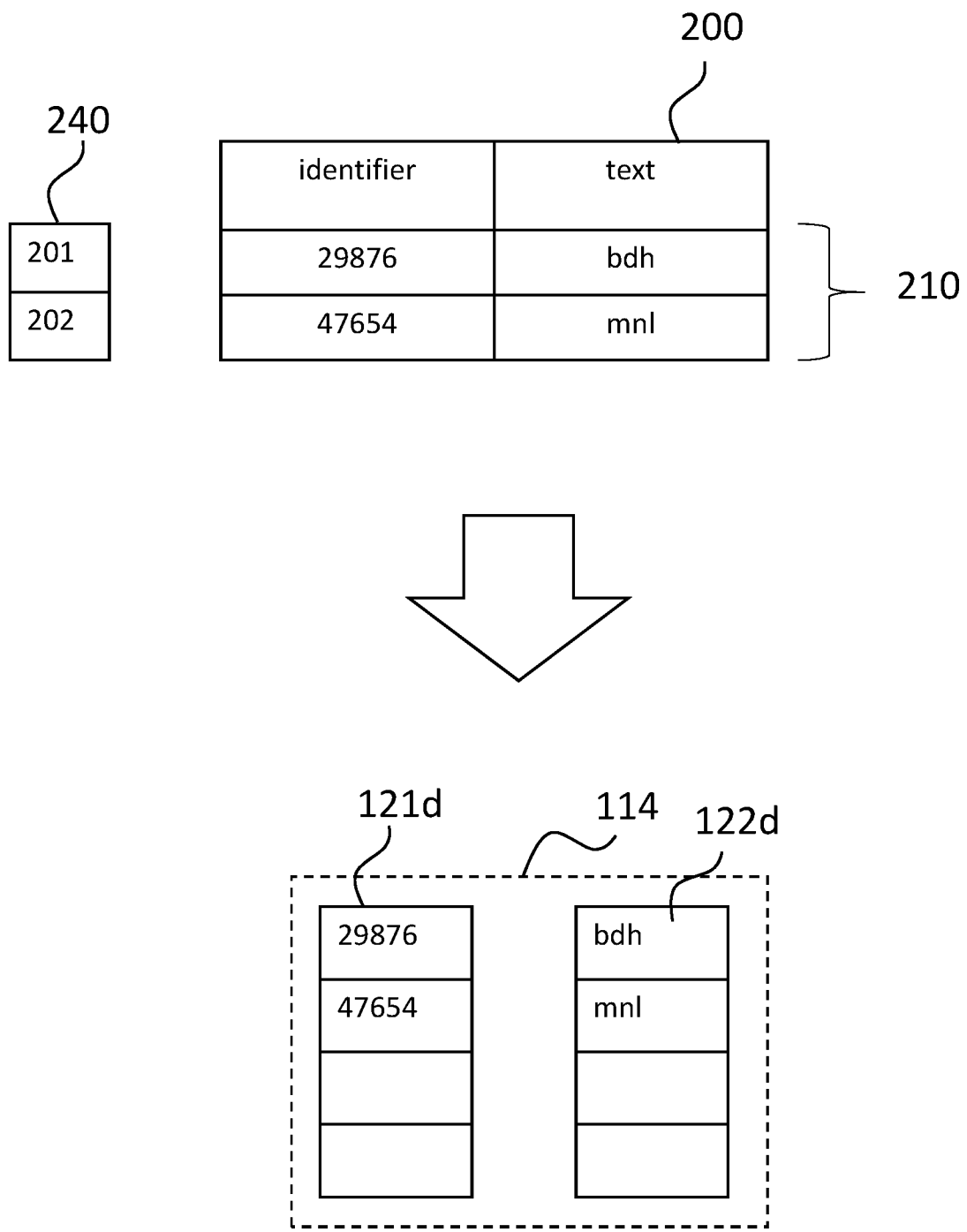
FIG. 11 is a schematic diagram of the columnstore and the row store of FIG. 9, according to another example.

FIG. 11 shows a new segment 114 of the columnstore 100 that has a first column 121*d* containing identifiers and a second column 122*d* containing text, according to an example. Creating a new segment of a columnstore 100 based on the status of the rowstore 200 moves all or some of the data that was previously stored in the rowstore 200 into the new segment of the columnstore 200.

In some cases, recently accessed data is promoted from the columnstore and then maintained within the rowstore and not moved into a new segment, allowing the rowstore 200 to contain the recently accessed data. This improves concurrency within the table comprising the columnstore 100 and the rowstore 200, increases throughput and results in lower wait time for queries to be processed.

Processing Agent

An agent could be designed and used with the combined columnstore 100 and rowstore 100 data structure of FIGS. 9-11. In one example, the agent is configured to analyze queries that are received over a predetermined time period. The analysis carried out by the agent could be to profile incoming queries and identify a frequency of certain types of queries to determine the most recently used or most frequently used queries. An index of such queries could be built for future reference to speed up query processing.

Such analysis could form the basis of operations performed by the agent to speed up future query processing and obtaining of results. In some examples, the agent may: determine commonly used filters and/or indexes; automatically determine which columns of a columnstore to index without user input; when to generate a new column segment from a rowstore; dynamically determine whether to store data in a row-wise or column-wise format based on previously received queries relating to said data, for instance whether the data is relied upon for transaction and/or analytical processed. Using an agent in this manner would make the columnstore 100 and the rowstore 200 more tunable.

In one example, the agent could be embodied using machine learning. For instance, the agent may undergo one or more training and testing phases. In a training phase the agent is provided with a set of queries that train the agent to recognize patterns in the queries and subsequently perform various actions based on the recognized patterns, for example, to build indexes that would benefit a filter present within a plurality of queries. In a testing phase, the agent is provided with another set of queries and its performance in analyzing those queries is monitored, for example, how much performance is gained from the indexes built by the agent based on the recognized patterns or how successful the agent is in recognizing a particular filter. The performance of the agent in a testing phase may form the basis of the next or future training phase of the agent. For example, to improve the agent in areas where it had a weaker performance. In some examples, the agent is defined by computer readable instructions that are executed by a processor of a computing system.

At least some aspects of the embodiments described herein with reference to FIGS. 1-11 comprise computer processes performed in processing systems or processors. However, in some examples, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

In the preceding description, for purposes of explanation, numerous specific details of certain examples are set forth. Reference in the specification to "an example" or similar language means that a particular feature, structure, or characteristic described in connection with the example is included in at least that one example, but not necessarily in other examples The above examples are to be understood as illustrative. It is to be understood that any feature described in relation to any one example may be used alone, or in combination with other features described, and may also be used in combination with one or more features of any other of the examples, or any combination of any other of the examples. Furthermore, equivalents and modifications not described above may also be employed.

Further examples are given in the following aspects of the present disclosure.

Aspects of the Disclosure

In a first aspect, a computer-implemented method of accessing data in a columnstore comprises a plurality of segments, wherein each segment comprises a plurality of columns and each column comprises a plurality of rows. The method comprises receiving a query comprising a parameter having a value; identifying a row of a segment of the columnstore, wherein the row comprises a first entry that matches the value of the parameter; determining an offset within a second column of the segment based on a location of the row within the segment; retrieving, from the second column based on the offset, data of a second entry in the row that corresponds to the value of the parameter.

In a second aspect, which may be used in combination with the first aspect, the retrieving comprises: accessing the second column at a position determined based on the offset to retrieve the data of the second entry.

In a third aspect, which may be used in combination with the second aspect, the second column is associated with a storage scheme and the method further comprises: determining the position of the second entry in the second column based on the offset within and the storage scheme of the second column.

In a fourth aspect, which may be used in combination with the third aspect, the storage scheme assigns a variable number of bytes per row, and the method comprises: determining a number of rows preceding the row within the segment; interrogating an offset table associated with the storage scheme to determine the variable number of bytes per row; and determining the offset based on the number of rows and the variable number of bytes per row.

In a fifth aspect, which may be used in combination with the third aspect, the storage scheme of the second column assigns a fixed number of bytes per row of the segment, and determining the offset comprises: determining a number of rows preceding the row within the segment; and assigning a fixed number of bytes to the determined number of rows according to the storage scheme of the second column, wherein the offset corresponds to the fixed number of bits.

In a sixth aspect, which may be used in combination with the third aspect, the storage scheme is an encoding scheme used to encode the entries of the second column.

In a seventh aspect, which may be used in combination with the third aspect, the method comprises: decoding the second entry of the second column based on the encoding scheme.

In an eighth aspect, a computer-implemented method of updating data comprises: identifying a row in a segment of a columnstore, the row having at least one entry containing data matching a value of a parameter of a query; moving the identified row to a rowstore; manipulating the data of the least one entry in the rowstore based upon an update request; and in response to the manipulating, updating a status of the row to indicate that updates to the data of the row are located in the rowstore.

In a ninth aspect, which may be used in combination with the eighth aspect, the method comprises: generating the rowstore comprising a plurality of rows including the row of the columnstore.

In a tenth aspect, which may be used in combination with the eighth aspect, the method comprises: activating an access lock on an identifier of the row whilst the data of the at least one entry is manipulated in the rowstore; and releasing the access lock after the manipulating is completed.

In an eleventh aspect, which may be used in combination with the eighth aspect, the method comprises: creating a column segment comprising the data stored within the rowstore, the column segment to be inserted into the columnstore.

In a twelfth aspect, which may be used in combination with the eleventh aspect, the column segment is created after a predetermined period of time or a criterion relating to a predetermined size of the row store has been met.

In a thirteenth aspect, which may be used in combination with the twelfth aspect, the method comprises: storing the rowstore in a random access memory.

In a fourteenth aspect, which may be used in combination with the eighth aspect, the rowstore is associated with one or more index tables, wherein each of a plurality of columns of the rowstore corresponds to at least one index table.

What is claimed is:

1. A computer-implemented method of updating data, the method comprising:
   obtaining a columnstore comprising a plurality of columns and a plurality of rows, wherein the columnstore is segmented into a plurality of segments and each of the plurality of columns is segmented into a plurality of column segments, wherein each segment of the columnstore comprises a plurality of column segments of the respective columns and each column segment of a respective column comprises a plurality of rows;
   receiving a query comprising a parameter;
   determining a key corresponding to the parameter;
   identifying a mapping structure, from a plurality of mapping structures, relating to said key, wherein the identified mapping structure corresponds to a respective segment of the columnstore;
   interrogating the identified mapping structure to determine a value corresponding to the key, wherein the value identifies an entry of an index table of a plurality of index tables that corresponds to a first said respective segment of the columnstore, wherein the identified entry of the index table identifies a row of a first column segment of the first said respective segment of the columnstore that contains a first entry containing data matching a value of the parameter of the query and the row having other entries in different one or more column segments, respectively;

moving the identified row to a rowstore;

manipulating the data of the first entry in the rowstore based upon an update request;

activating an access lock on an identifier of the row whilst the data of the first entry is manipulated in the rowstore, whereby rows other than the identified row for which the access lock has been activated are available for access such that other concurrent queries are allowed to access data within entries of other rows in the segment of the columnstore from which the identified row was moved;

releasing the access lock after the manipulating is completed; and in response to the manipulating, updating a status of the identified row to indicate that updates to the retrieved data of the first entry of the identified row are located in the rowstore.

2. The computer-implemented method of claim 1, comprising generating the rowstore comprising a plurality of rows including the identified row of the columnstore.

3. The computer-implemented method of claim 1, comprising creating a column segment comprising the data stored within the rowstore, the column segment to be inserted into the columnstore.

4. The computer-implemented method of claim 1, comprising storing the rowstore in a random access memory.

5. The computer-implemented method of claim 1, further comprising:
merging the plurality of mapping structures to form a single mapping structure.

6. The computer-implemented method of claim 1, comprising generating a data structure relating to the columnstore and for use in processing a query according to claim 1, the generating comprising:
generating the mapping structure and the index table for the respective segment of the columnstore, wherein the mapping structure and the index table comprise at least one entry, the at least one entry of the respective mapping structure comprising a mapping between a key and a value identifying the at least one entry of the corresponding index table comprising a mapping between the key and a row in the respective segment of the columnstore.

7. The computer-implemented method of claim 1, further comprising:
for each entry of the identified row in a column segment of the different one or more column segments that corresponds to the query:
determining an offset within the respective column segment based on a location of the row in the segment; and
retrieving, from the respective column segment and based on the respective offset, data of the entry.

8. A non-transitory computer readable medium comprising instructions that, when executed by a processor of a computer, cause a computer comprising the processor to carry out the method of claim 1.

9. The computer-implemented method of claim 3, wherein the column segment is created after a predetermined period of time or a criterion relating to a predetermined size of the rowstore has been met.

10. A database system comprising a database having data stored in a columnstore, a processor, and memory comprising processor readable instructions, which when executed on the processor cause the processor to:
obtain a columnstore comprising a plurality of columns and a plurality of rows, wherein the columnstore is segmented into a plurality of segments and each of the plurality of columns is segmented into a plurality of column segments, wherein each segment of the columnstore comprises a plurality of column segments of the respective columns and each column segment of a respective column comprises a plurality of rows;

receive a query comprising a parameter;

determine a key corresponding to the parameter;

identify a mapping structure, from a plurality of mapping structures, relating to said key, wherein the identified mapping structure corresponds to a respective segment of the columnstore;

interrogate the identified mapping structure to determine a value corresponding to the key, wherein the value identifies an entry of an index table of a plurality of index tables that corresponds to a first said respective segment of the columnstore, wherein the identified entry of the index table identifies a row of a first column segment of the first said respective segment of the columnstore that contains a first entry containing data matching a value of the parameter of the query and the row having other entries in different one or more column segments, respectively;

move the identified row to a rowstore;

manipulate the data of the first entry in the rowstore based upon an update request;

activate an access lock on an identifier of the row whilst the data of the first entry is manipulated in the rowstore, whereby rows other than the identified row for which the access lock has been activated are available for access such that other concurrent queries are allowed to access data within entries of other rows in the segment of the columnstore from which the identified row was moved;

release the access lock after the manipulating is completed; and in response to the manipulation, update a status of the identified row to indicate that updates to the retrieved data of the first entry of the identified row are located in the rowstore.

11. The database system of claim 10, wherein the processor readable instructions, when executed, further cause the processor to:
generate the rowstore comprising a plurality of rows including the identified row of the columnstore.

12. The database system of claim 10, wherein the processor readable instructions, when executed, further cause the processor to:
create a column segment comprising the data stored within the rowstore, the column segment to be inserted into the columnstore.

13. The database system of claim 10, wherein the processor readable instructions, when executed, further cause the processor to:
store the rowstore in a random access memory.

14. The database system of claim 10, wherein the processor readable instructions, when executed, further cause the processor to:
merge the plurality of mapping structures to form a single mapping structure.

15. The database system of claim 10, wherein the processor readable instructions, when executed, further cause the processor to:

generate a mapping structure and an index table for each of the plurality of segments of the columnstore, wherein each mapping structure and each index table comprise at least one entry, each entry of the respective mapping structure comprising a mapping between a key and a value identifying at least one entry of the corresponding index table comprising a mapping between the key and a row in a respective segment of the plurality of segments.

16. The database system of claim 10, wherein the processor readable instructions, when executed, further cause the processor to:
   for each entry of the identified row in a column of the different one or more column segments that corresponds to the query:
      determine an offset within the respective column based on a location of the row in the segment; and
      retrieve, from the respective column and based on the respective offset, data of the entry.

17. The database system of claim 12, wherein the column segment is created after a predetermined period of time or a criterion relating to a predetermined size of the rowstore has been met.

\* \* \* \* \*